Figure 3:
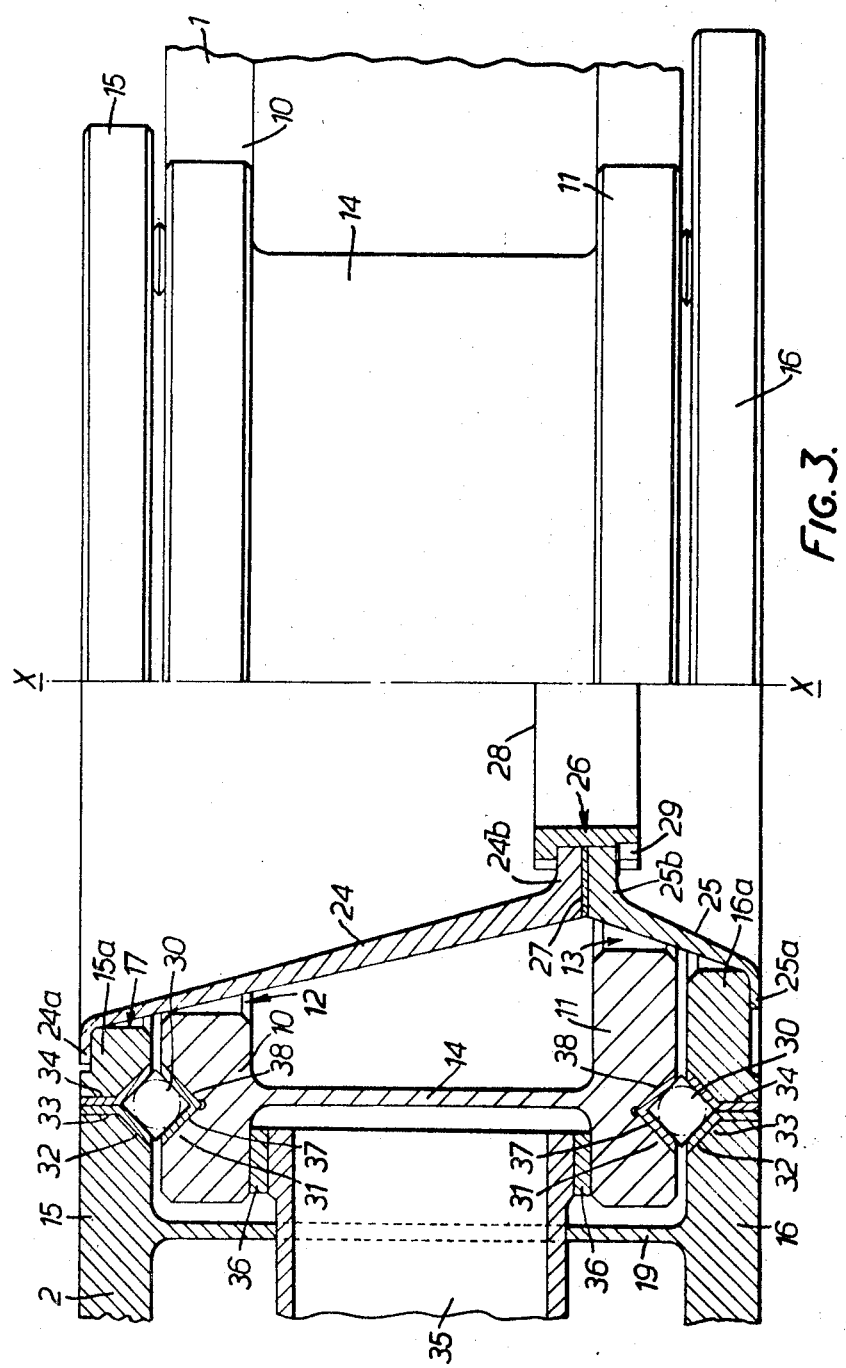

United States Patent [19]
Ransom

[11] 3,734,430
[45] May 22, 1973

[54] AIRCRAFT HAVING VARIABLE SWEEP-BACK WINGS

[75] Inventor: Stephen Ransom, Saint Annes-On-Sea, Lancashire, England

[73] Assignee: British Aircraft Corporation Limited, London, England

[22] Filed: Mar. 3, 1970

[21] Appl. No.: 24,414

[30] Foreign Application Priority Data

Mar. 7, 1969 Great Britain.....................12,302/69

[52] U.S. Cl....................................................244/46
[51] Int. Cl................................................B64c 3/40
[58] Field of Search ......................244/46; 308/244, 308/202–204, 3, 1; 180/79

[56] References Cited

UNITED STATES PATENTS

| | | | |
|---|---|---|---|
| 2,683,574 | 7/1954 | Peterson | 244/46 |
| 2,794,608 | 6/1957 | Johnson | 244/46 |
| 3,018,985 | 1/1962 | Voigt | 244/46 |
| 3,023,984 | 3/1962 | Brennan | 244/46 |
| 3,023,983 | 3/1962 | Boorer | 244/46 |

*Primary Examiner*—Robert F. Stahl
*Attorney*—Cushman, Darby & Cushman

[57] ABSTRACT

A wing pivot assembly for an aircraft with variable-sweep-back wings, which comprises a pair of lugs secured to a wing and a cooperating pair of apertured lugs secured to the fuselage of the aircraft, the fuselage lugs lying between and close to the wing lugs. Both pairs of lugs are formed with coaxial central apertures, and the outer portions of the adjacent lugs are formed with opposed circular grooves coaxially surrounding the apertures, in which grooves are housed bearing rollers by which the upper wing lug is journalled on the upper fuselage lug, and the lower wing lug is journalled on the lower fuselage lug. The grooves may either be of trapezoidal section, for use with tapering rollers, or they may be of V-section for use with cylindrical rollers whose axes are radial and are inclined in alternately-opposed directions. A clamping device in the form of a pair of flanged rings whose outer flanges are engaged with the two wing lugs, the rings being drawn together by a nut-and-bolt device at their adjacent inner flanges to apply an axial clamping thrust to the pivot assembly.

7 Claims, 5 Drawing Figures

Patented May 22, 1973
3,734,430
3 Sheets-Sheet 1
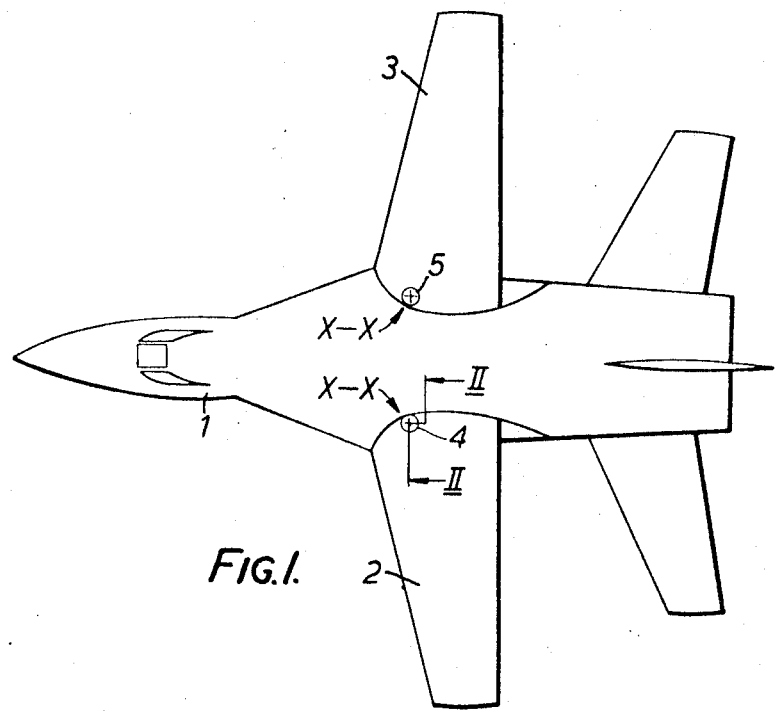
FIG. 1.
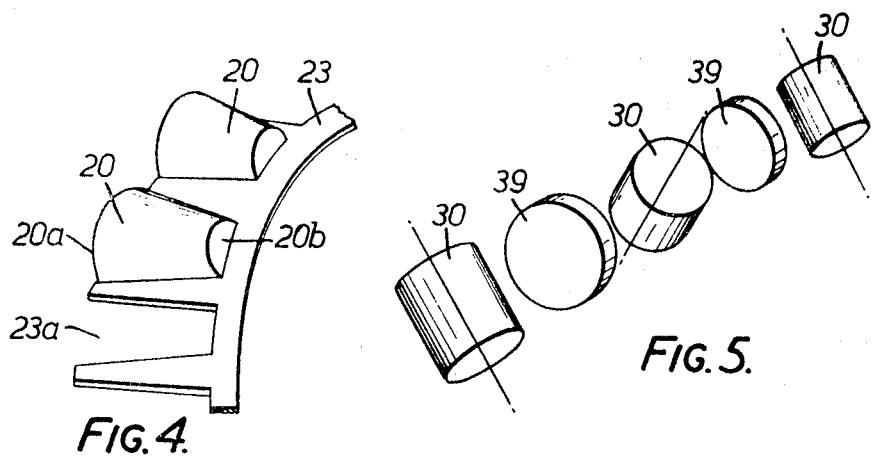
FIG. 4.
FIG. 5.
INVENTOR
STEPHEN RANSOM
BY CUSHMAN, DARBY
& CUSHMAN
ATTORNEYS

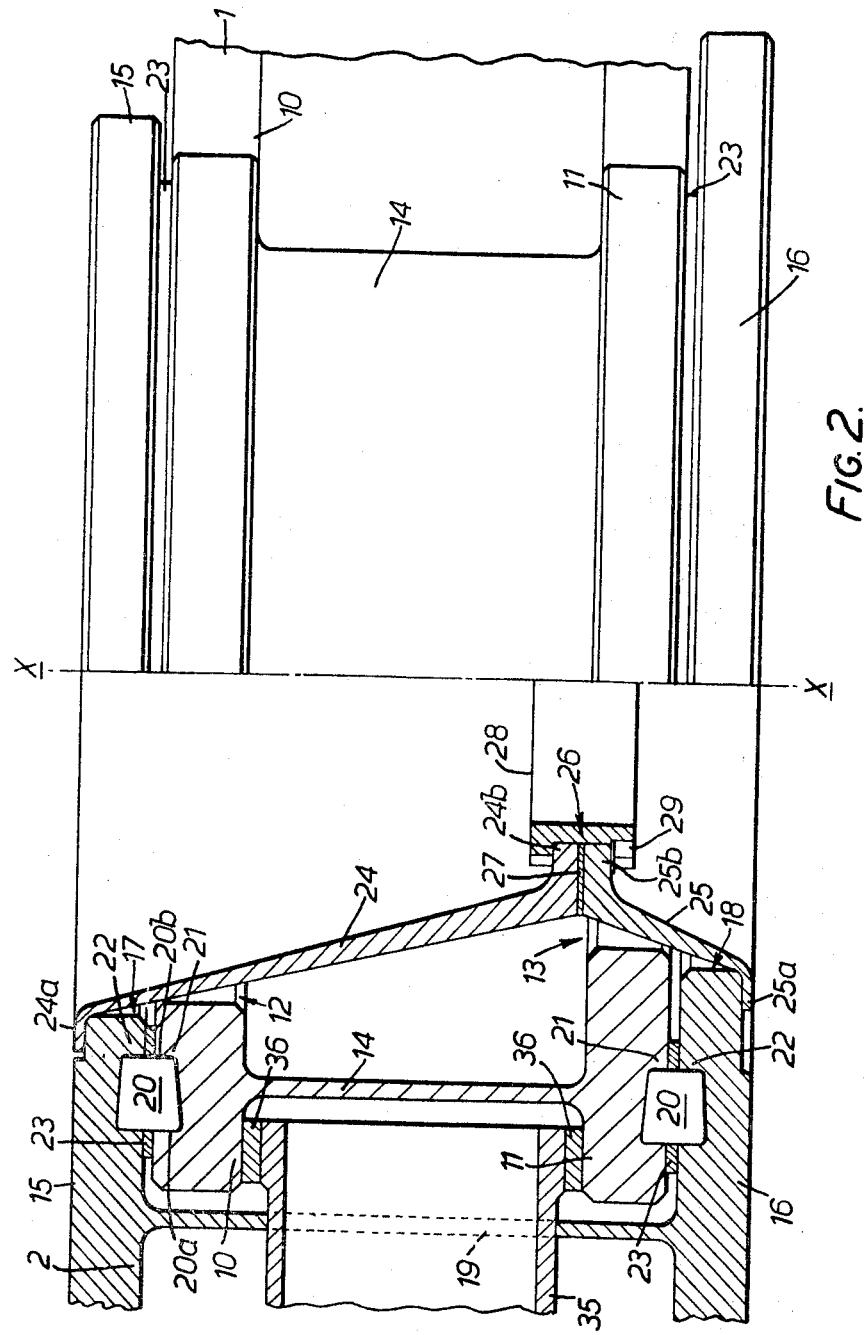

AIRCRAFT HAVING VARIABLE SWEEP-BACK WINGS

The present invention relates to aircraft having variable sweep-back wings, in which the wings pivot in relation to the fuselage about substantially vertical axes to alter their angle of sweep-back.

In this specification the term "vertical" is used to mean the direction, in relation to the aircaft, which is vertical in normal unbanked level flight.

According to the invention, an aircraft wing pivot assembly comprises a pair of vertically-spaced apertured lugs forming part of the fuselage structure, a further pair of vertically-spaced apertured lugs forming part of the wing structure, one of the pairs of lugs (referred to as the inner pair) lying in between the other pair (referred to as the outer pair), the upper lugs of both pairs being provided with opposed tracks between which an upper, circularly disposed, series of bearing elements are located and the lower lugs of both pairs being similarly provided with opposed tracks between which a lower, circularly disposed, series of bearing elements are located, and the outer pair of lugs being provided with a clamping means extending through the apertures of all four lugs and acting between the lugs of the outer pair to urge them toward each other and toward the inner pair of lugs to maintain the two series of bearing elements in close contact with their respective tracks.

The tracks for each of the two series of bearing elements may comprise opposed circular grooves formed in the facing surfaces of the adjacent lugs.

The grooves may be generally trapezoidal in cross-section in which case the bearing elements of each series comprise tapered rollers spaced one from another with their axes radially disposed with respect to the grooves by means of an annular cage having roller-receiving slots at spaced intervals around its periphery.

Alternatively, the grooves may be V-shaped in cross-section, in which case the bearing elements of each series comprise rollers separated one from another by disc-like spacers, and the rollers have their axes disposed in planes which are substantially radial with respect to the grooves, and adjacent rollers have their axes inclined one to another so that successive rollers are in rolling contact with alternate sides of each V-section groove.

The invention may be carried into practice in various ways but two specific embodiments will now be described by way of example only with reference to the accompanying drawings, in which:

FIG. 1 is a plan view of an aircraft,

FIG. 2 is a part-sectional view of a wing pivot assembly, the section being taken through the substantially vertical major axis of the pivot, as indicated by the line II—II of FIG. 1, FIG. 3 is a similar view of an alternative form of wing pivot assembly to that of FIG. 2, FIG. 4 illustrates a method of caging the bearing elements of the assembly of FIG. 2, and FIG. 5 illustrates the bearing elements of the assembly of FIG. 3.

Referring initially to FIG. 1, an aircraft has a fuselage 1 and variable sweep-back wings 2 and 3 which respectively pivot about substantially vertical axes X—X on wing pivot assemblies 4 and 5. The wing pivot assemblies 4 and 5 are identical in all major aspects and for clarity only one, namely that referenced 4, will now be fully described.

Referring now to FIG. 2, the fuselage 1 is provided with a pair of vertically-spaced lugs 10,11 each having an aperture, 12,13 respectively, formed concentrically therein. The lugs 10, 11 are spaced apart by an integral web 14 which is substantially cylindrical.

The root of the wing 2 is also provided with a pair of spaced lugs 15, 16 each having an aperture, 17, 18 respectively, formed concentrically therein. The lugs 15 and 16 are spaced apart by an integral web 19 being part of the wing structure. The apertures 12, 13 and 17, 18 are concentric with one another and are effectively formed about a substantially vertical axis X—X which is the major axis of the wing pivot assembly and about which the wing 2 rotates.

The upper lugs 10 and 15 of each pair of lugs, as shown in FIG. 2, are closely adjacent to one another and are separated by an upper series of bearing elements. The bearing elements are, in this embodiment, tapered rollers 20 which are constrained to roll on tracks formed by the bottoms of opposed trapezoidally-cross-sectioned circular grooves 21, 22 formed in the adjacent faces of the upper lugs 10 and 15, respectively. The grooves 21, 22 form together in effect a circular track the axis of which is coincident with the axis X—X.

The individual rollers 20 forming the series of bearing elements are spaced by an annular cage 23, see especially FIG. 4, which also aids insertion of the rollers into the track in a manner to be described. The cage 23 has roller receiving slots 23a at spaced intervals around its periphery.

The lower lugs 11 and 16 of each pair of lugs, as shown in FIG. 2, are again closely adjacent one another and are provided with a similar series of rollers 20 constrained in a similar manner to the upper series of rollers.

In both the upper and lower series of rollers the rollers 20 may have slightly convex part-spherical outer end faces 20a and their co-operating faces, that is to say the outer sides of the grooves 21, 22 are then formed in a slightly concave manner.

The wing pivot assembly is held together by a clamp extending through the apertures 12, 13 and 17, 18 and comprising two hollow frusto-conical members 24, 25 each having an external flange 24a, 25a, at its end of larger diameter arranged to respectively engage the lug 15 and the lug 16, and an internal flange 24b, 25b at its end of smaller diameter, the flanges 24b and 25b being drawn together at 26 by means of a tubular nut 29. This arrangement has the advantage that on tightening a uniform load is applied at all points around the flanges.

As the nut 29 and the bolt 28 are screwed together and the members 24 and 25 are drawn together, the upper and lower lugs 15, 16 are drawn towards each other and towards the adjacent lugs 10, 11. Thus the bearing elements of each series are maintained in close contact with their respective tracks.

The flanges 24b, 25b may have a shim or shims 27 placed between them so that the inward load applied to the lugs 15, 16 can be accurately pre-determined. This load is reacted by the web 14.

The insertion of the rollers 20 into each track 21, 22 is effected by means of two radially extending apertures (not shown) respectively formed in the adjacent faces of the lugs 10, 15 and 11, 16 and leading into each track 21, 22. Each aperture is of such dimensions that a roller can be inserted therethrough, but since the aperture must be in the same horizontal plane as the track 21 or 22 into which it feeds the aperture is partly formed in one lug and partly in another, so that insertion or removal can only be achieved when the parts of the aperture are in register, that is to say at one angular position of the wing with respect to the fuselage.

Initially the wing lugs 15, 16 and the fuselage lugs 10, 11 are positioned so that their grooves 21, 22 co-operate to provide the bearing tracks. The cages 23 are then inserted and the wing lugs are angularly moved until the roller insertion apertures are in register with one another. Each cage 23 is then rotated until one of its roller receiving slots 23a is in register with the roller insertion aperture, whereupon a roller can be inserted into the track 21, 22. Rotation of the cage 23 allows successive slots 23a to be presented to accept successively introduced rollers 20 until the tracks are completely filled with rollers. The roller insertion apertures are each then filled with a specially machined split plug (not shown) the split portions of which are anchored to respective adjacent faces of the lugs enclosing the rollers.

Referring now to FIGS. 3 and 5, which together illustrate another embodiment of the invention and in which like components are allotted like reference numerals to those of FIG. 2, it can be seen that the tapered rollers 20 of the earlier Figure are replaced by cylindrical rollers 30. These rollers are incorporated in the wing pivot between the same components as the rollers of the earlier Figure, namely the upper lugs 10, 15 and the lower lugs 11, 16. Circular tracks in the rollers 30 are formed by opposed grooves 31, 32 concentrically formed in the adjacent faces of the upper and lower lugs. Purely as an aid to manufacture, the track surfaces with which the rollers co-operate are formed separately as rings of hardened material, for example a suitable steel, and are inserted in the grooves 31, 32. Those engaging with the lugs 15, 16 are referenced 33, 34 whilst those engaging with the lugs 10, 11 are referenced 37. As a further aid to manufacture and to provide for insertion of the bearing elements, each of the lugs 15, 16 is split vertically along the center line of its groove 32 so that each such lug has a removable inner ring 15a, 16a respectively. The rings 37 comprise "V" cross-sectioned rings which may be provided with packing shims 38 to position the surfaces correctly with respect to their respective lugs 10,11.

As shown in FIG. 3, the bearing grooves 31, 32 are each V-shaped in cross-section. The arrangement of the bearing elements within the grooves is shown particularly in FIG. 5. Each roller 30 has its major axis positioned in a radial plane which intersects the major axis X—X of the pivot, but alternate rollers have their axes inclined at 45° and 135° to the axis X—X. Thus adjacent rollers have their axes inclined at 90° to each other, so that the successive rollers are in rolling contact with alternate pairs of opposing sides of the rectangular channels formed by the V-section grooves. The rollers 30 are separated from one another by spacer discs 39 which have their end faces touching the rolling surfaces of adjacent rollers 30. The length of each roller 30 is identical to its diameter. The diameter of the spacer discs 39 is identical to that of the rollers 30.

The spacer discs 39 may have part-spherical convex end faces to minimize rubbing contact with adjacent rollers 30. The rollers 30 may have rolling surfaces which are convex in axial section, and part-spherical convex end faces, in which case the co-operating side walls of the grooves 31, 32 would be formed in a concave manner.

Shear loads on the wing pivot assembly may be transmitted in known manner from the wing to the fuselage by a bracket 35 mounted on the wing which co-operates with bearing pads 36 of low friction material mounted on the fuselage lugs 10, 11.

The insertion of the rollers 30 and the spacer discs 39 is effected through the annular gap formed when the lugs 15, 16 and 10, 11 are assembled with the rings 15a and 16a not in position. When the rollers 30 and spacer discs 39 are all inserted, the rings 15a and 16a are positioned and clamped by the members 24, 25 and the nut and bolt arrangement 28, 29 as described with respect to FIG. 2.

The grooves 21, 22 of the pivot assembly of FIG. 2 may be provided with separate bearing surfaces on members similar to those provided (referenced 33, 34 and 37, 38) in the grooves 31, 32 of FIG. 3, but of a cross-section suitable for engagement by the tapered rollers 20.

What we claim as our invention and desire to secure by Letters Patent is:

1. An aircraft wing pivot assembly comprising a pair of vertically-spaced apertured lugs forming part of a fuselage structure, a further pair of vertically-spaced apertured lugs forming part of a wing structure, one of the pairs of lugs (referred to as the inner pair) lying in between the other pair (referred to as the outer pair), the upper lugs of both pairs being provided with opposed tracks between which an upper, circularly disposed, series of bearing elements are located, and the lower lugs of both pairs being provided with opposed tracks between which a lower, circularly disposed, series of bearing elements are located, and the outer pair of lugs being provided with a clamping means extending through the apertures of all four lugs and acting between the lugs of the outer pair to urge them toward each other and toward the inner pair of lugs to maintain the two series of bearing elements in close contact with their respective tracks.

2. An aircraft wing pivot assembly according to claim 1 in which the tracks for each series of bearing elements comprise opposed circular grooves formed in the facing surfaces of the adjacent lugs.

3. An aircraft wing pivot assembly according to claim 2 wherein the grooves are generally trapezoidal in cross-section and the bearing elements of each series comprise tapered rollers spaced one from another with their axes radially disposed with respect to the grooves by means of an annular cage having roller-receiving slots at spaced intervals around its periphery.

4. An aircraft wing pivot assembly according to claim 2 wherein the grooves are V-shaped in cross-section and the bearing elements of each series comprise rollers separated one from another by disc-like spacers, the rollers having their axes disposed in planes which are substantially radial with respect to the grooves, and adjacent rollers having their axes inclined one to another so that the successive rollers are in rolling contact with alternate sides of each V-section groove.

5. An aircraft wing pivot assembly according to claim 1 wherein the clamping means comprises two hollow frusto-conical members, having external flanges at their ends of larger diameter and having internal flanges at their ends of smaller diameter, the external flanges being engaged respectively with the outer pair of lugs and the internal flanges being drawn together by a screw threaded connection.

6. An aircraft wing pivot assembly according to claim 1 in which the inner pair of lugs forms part of a fuselage structure and the outer pair of lugs forms part of a wing structure.

7. An aircraft wing pivot assembly according to claim 1 in which the inner pair of lugs has surfaces engaged by opposed bearing pads carried on a bracket in structural association with the outer pair of lugs.

* * * * *